US010319255B2

(12) United States Patent
Booth et al.

(10) Patent No.: US 10,319,255 B2
(45) Date of Patent: Jun. 11, 2019

(54) MEASURING LANGUAGE LEARNING USING STANDARDIZED SCORE SCALES AND ADAPTIVE ASSESSMENT ENGINES

(71) Applicant: Pearson Education, Inc., New York, NY (US)

(72) Inventors: David Booth, Cambridge (GB); Paul Seddon, Newmarket (GB)

(73) Assignee: Pearson Education, Inc., Bloomington, MN (US)

( * ) Notice: Subject to any disclaimer, the term of this patent is extended or adjusted under 35 U.S.C. 154(b) by 64 days.

(21) Appl. No.: 15/346,331

(22) Filed: Nov. 8, 2016

(65) Prior Publication Data
US 2018/0130375 A1    May 10, 2018

(51) Int. Cl.
G09B 19/06    (2006.01)
G09B 7/04     (2006.01)
G09B 7/08     (2006.01)

(52) U.S. Cl.
CPC .............. G09B 19/06 (2013.01); G09B 7/04 (2013.01); G09B 7/08 (2013.01)

(58) Field of Classification Search
None
See application file for complete search history.

(56) References Cited

U.S. PATENT DOCUMENTS

| 8,175,511 B1 | 5/2012 | Sordo et al. |
| 2001/0044795 A1 | 11/2001 | Cohen et al. |
| 2002/0016814 A1 | 2/2002 | Convent et al. |
| 2002/0091702 A1 | 7/2002 | Mullins |
| 2003/0037034 A1 | 2/2003 | Daniels et al. |
| 2003/0039948 A1* | 2/2003 | Donahue ............ G09B 7/02 434/322 |
| 2003/0074370 A1 | 4/2003 | Gargano et al. |
| 2005/0055357 A1 | 3/2005 | Campbell |
| 2005/0277103 A1* | 12/2005 | Townshend ......... G09B 7/00 434/362 |
| 2007/0231780 A1* | 10/2007 | Shulman ............ G09B 7/08 434/350 |
| 2011/0039249 A1* | 2/2011 | Packard ............ G09B 5/00 434/362 |
| 2012/0214147 A1 | 8/2012 | Ernst et al. |

(Continued)

Primary Examiner — Jason T Yen
(74) Attorney, Agent, or Firm — Quarles and Brady LLP

(57) ABSTRACT

The present invention allows a language learning platform to calculate a user's overall language skill. This may be performed as a standalone test or before, during and/or after a language course. The language learning platform may perform a Pre-CAT process, a CAT process, a stage 2-fixed form process and a scoring and reporting process. The Pre-CAT process is designed to quickly get an initial estimate of the user's overall language skill. The CAT processes improves on the accuracy of the Pre-CAT process, preferably until the conditional standard error of measurement for the user's overall language skill is less than a predetermined number. The stage 2-fixed form process may use the user's overall language skill to select speaking, listening and writing assessment items of an appropriate difficulty for the user. The language learning platform may score the responses of the user, present the measured user's overall language skill to the user and save the user's overall language skill in a database for use in future tests.

20 Claims, 9 Drawing Sheets

(56) References Cited

U.S. PATENT DOCUMENTS

| | | |
|---|---|---|
| 2012/0231439 A1 | 9/2012 | Attali |
| 2012/0276505 A1 | 11/2012 | Al Badrashiny et al. |
| 2014/0164507 A1 | 6/2014 | Tesch et al. |
| 2014/0295384 A1 | 10/2014 | Nielson et al. |
| 2014/0335497 A1 | 11/2014 | Gal et al. |
| 2014/0335502 A1 | 11/2014 | Huang et al. |
| 2015/0325138 A1* | 11/2015 | Selinger .................. G09B 7/00 434/322 |
| 2016/0225278 A1 | 8/2016 | Leddy |
| 2016/0293036 A1* | 10/2016 | Niemi .................... G09B 7/077 |

* cited by examiner

MEASURING LANGUAGE LEARNING USING STANDARDIZED SCORE SCALES AND ADAPTIVE ASSESSMENT ENGINES

FIELD OF THE INVENTION

The present invention generally relates to systems and methods for determining a language skill of a user, i.e., a student, using a database of calibrated assessment items and adaptive assessment engines.

SUMMARY OF THE INVENTION

The invention stores calibrated assessment items in a database that have been calibrated by presenting and scoring the assessment items to previous students, whose language skill may or may not be known. The invention generates a random item pattern of question types (true/false; fill in the blank; multiple choice, etc.), where question types may be repeated. Calibrated assessment items may be sequentially selected that are of the next question type in the random item pattern of question types and that will provide the maximum amount of information in calculating the user's language skill. The invention presents on a client device the selected assessment items and scores the responses from the user. The user's language skill is preferably updated after scoring the response to each calibrated assessment item to assist in selecting the next calibrated assessment item that will provide the maximum amount of information. The process may continue until the conditional standard error of measurement (CSEM) is below a predetermined value. The CSEM is a statistical measurement of the uncertainty in the measurement of the user's language skill. As described, the process may be repeated until a desired accuracy of the user's language skill is measured, i.e., the CSEM is below a predetermined level. This results in a customized testing process that greatly improves on the speed and accuracy of measuring the language skill of the user at any desired level of accuracy regardless of the current language skill of the user.

The present invention provides systems and methods for adaptively assessing a language learning of a user. In an example embodiment of the invention, the process may be broken-down into a Pre-Computer Adaptive Test (Pre-CAT) portion of a test, a Computer Adaptive Test (CAT) portion of the test, a stage 2-fixed form portion of the test and a scoring and reporting portion of the test. The different parts of the process or test may be performed by a language learning platform. The described process may be performed as a standalone process or may be performed in combination with a language lesson. When performed with a language lesson the disclosed process may be performed before, during and/or after the language lesson to determine an effectiveness of the language lesson.

The Pre-CAT portion of the test may be used to get an initial estimate of the user's overall language skill. The CAT portion of the test may be used to improve the accuracy of the measured user's overall language skill, preferably until the CSEM for the user's overall language skill is less than a predetermined amount. The stage 2-fixed form portion of the test may use the user's overall language skill (which should be very accurate after running the CAT portion of the test) to select and administer speaking, listening and writing questions of appropriate difficulty level to the user. The scoring and reporting portion of the test may aggregate all of the testing results, notify the user of the results and report and record the results in a database.

As an example embodiment of the Pre-CAT portion of the test, the language learning platform may receive a user identification from the user using a user interface displayed on a client device. The language learning platform may search in a first database for a history of the user associated with the user identification. The language learning platform may estimate an overall language skill of the user based on the history in the first database of the user, a difficulty level of a product being used by the user and/or responses to an initial plurality of assessment items displayed on the user interface to the user. The Pre-CAT portion of the test may be terminated early after a Pre-CAT time limit has been reached.

As an example embodiment of the CAT portion of the test, the language learning platform may retrieve a random item pattern comprising a sequence of question types. As a non-limiting example, the question types may be one or more true or false types of question, one or more a multiple choice types of question and one or more fill in the blank type of questions. Thus, as a specific example, the random item pattern may comprise the elements or question types of 1) fill in the blank, 2) true or false and 3) multiple choice, and 4) multiple choice. In this example, the sequence in the random item pattern has four question types (with three different question types), but the sequence may be made to have any desired number of question types.

The language learning platform may perform the following steps for each question type in the random item pattern. In other words the following steps may be performed for a 1) fill in the blank question type, followed by a 2) true or false question type, followed by a 3) multiple choice question type, followed by another 4) multiple choice question type, in that order. The language learning platform may select the next question type in the random item pattern (it will be a fill in the blank question type in this example on the first pass). The language learning platform may select an assessment item from a database of a plurality of calibrated assessment items, wherein the assessment item matches the next question type and closely matches the overall language skill of the user. The language learning platform may modify the user interface to present the assessment item to the user. The language learning platform may generate a score for a response from the user to the assessment item. The language learning platform may update the overall language skill of the user and a CSEM for the overall language skill of the user based on the score. The updated user's overall language skill may be used to select later assessment items.

After the language learning platform has processed all of the question types in order or sequence in the random item pattern, the language learning platform may perform the following steps, possibly at least once, until the CSEM of the overall language skill of the user is less than a predetermined value. The language learning platform may select a second next question type corresponding to the user's overall language skill or a second language skill of the user. The language learning platform may select a second assessment item from the database of calibrated assessment items, wherein the second assessment item matches the selected second next question type and matches the user's overall language skill or the second language skill of the user. The language learning platform may modify the user interface to present the second assessment item to the user. The language learning platform may generate a second score for a second response from the user to the second assessment item. The language learning platform may update the overall language skill of the user and the conditional standard error of measurement for the overall language skill of the user based on the second score. The language learning platform may compare the conditional standard error of measurement for the overall language skill of the user to a predetermined threshold. This steps in this paragraph may be repeated until the conditional standard error of measurement for the overall language skill of the user is less than the predetermined threshold.

The CAT portion of the test may be terminated early after a CAT time limit has been reached, a maximum number of CAT assessment items have been presented and scored from the user or the conditional standard error of measurement for the user's overall language skill is less than a predetermined value.

A stage 2-fixed form portion of the test may select one or more fixed forms for speaking, listening and writing based on the overall language skill of the user. The language learning platform may modify the user interface to present the one or more fixed forms for speaking, listening and writing to the user. The language learning platform may generate another score for a response to the one or more fixed forms for speaking, listening and writing. The language learning platform may update the overall language skill of the user and the conditional standard error of measurement of the overall language skill of the user based on the score for the response to the one or more fixed forms for speaking, listening and writing.

The scoring and reporting portion of the test may modify the user interface to notify the user of the overall language skill of the user, the results of the test or the change in results from the last test. The language learning platform may also record the results of the test in the database.

The above features and advantages of the present invention will be better understood from the following detailed description taken in conjunction with the accompanying drawings.

DETAILED DESCRIPTION

Figure 1:
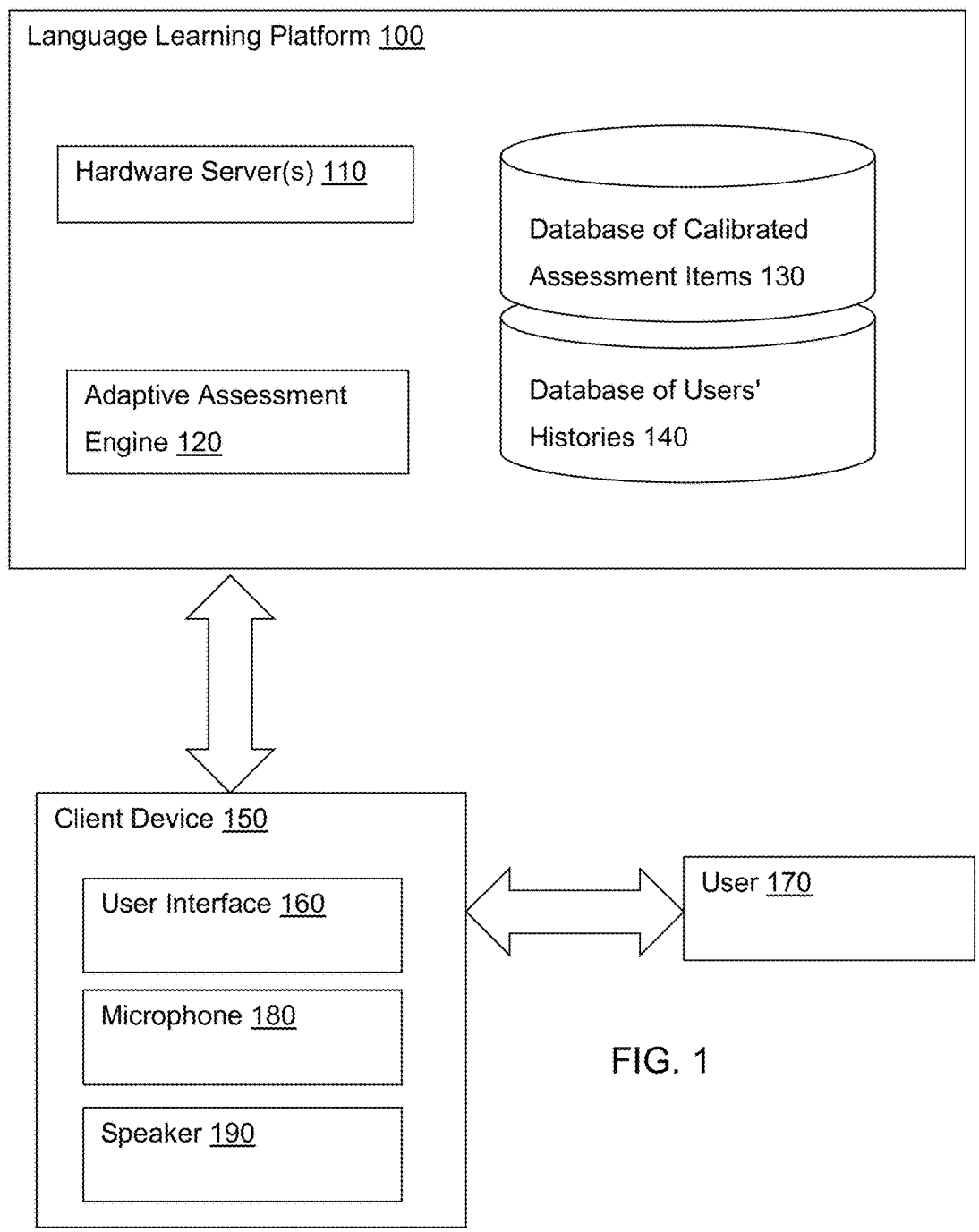
FIG. 1 is block diagram of an example embodiment of a system for administering the test and adaptively assessing the language learning of the user.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Referring to FIG. 1, the present invention includes a language learning platform 100 that communicates with a client device 150 used by a student, i.e., the user 170. The language learning platform 100 comprises one or more hardware servers 110 that, in combination with adaptive assessment engines 120, perform the steps and processes described herein for determining a language learning of the user 170.

While FIG. 1 only illustrates a single user 170 using a single client device 150 to make it easier to describe and understand the invention, it should be understood that the invention may be practiced as part of a larger computer network, where any number of users 170 may use the invention at the same time.

The arrows between the client device 150 and the language learning platform 100 represent one or more computer networks or communication pathways. Communications over the one or more computer networks or communication pathways may use any desired protocols.

The user 170, who is typically a student, may use a client device 150, such as, as non-limiting examples, a cell phone, PDA, tablet, dumb computer, laptop computer or desktop computer to access a website, a portal or a communication path to the language learning platform 100. The client device 150 may be owned by the user 170 or by the entity that owns the language learning platform 100. In preferred embodiments, the client device 150 is able to run a user interface 160 to display assessment items to the user 170, receive responses to the assessment items from the user 170 and transmit the user's responses to the language learning platform 100. The client device 150 also preferably includes a microphone 180 for recording spoken responses from the user 170 and a speaker 190 to transmit the sound of spoken words to the user 170.

The language learning platform 100 also comprises one or more databases 130 and 140. The databases 130 and 140 may be of any desired type that stores data on a physical storage medium and the databases 130 and 140 may be physically and/or logically combined or separated. As non-limiting examples, the one or more databases 130 and 140 may be relational databases, operational databases, distributed databases and/or a central database. While any number of databases 130 and 140 may be used, FIG. 1 illustrates a database of calibrated assessment items 130 and a database of users' histories 140. These databases 130 and 140 may in fact be part of a single database or broken into parts that reside in several different databases.

The language learning platform 100 is preferably available globally. Users may access the system using a variety of Internet browsers from personal computers and specified mobile devices, such as tablets and phones. In preferred embodiments, there are no requirements to install any of the platform components on a user's computer. Data may be stored on the language learning platform servers or a third party's servers managed on a private web service. All the application logic, including that of the adaptive algorithms, may reside on servers within those same environments.

The database of calibrated assessment items 130 preferably stores a plurality of calibrated assessment items. Each calibrated assessment item is a question that may be used to determine a user's language skill. Each assessment item may be calibrated by presenting the assessment item to a large number of students at different language skill levels and scoring their responses. The students are preferably from a variety of different countries and are thus native language speakers of a variety of different languages. Knowledge of each student's user's language skill is not necessary, but this information may be used, if known, in calibrating the assessment items.

Assessment items that are correctly answered by most students of all levels may be calibrated as a low skill assessment item while assessment items that are typically correctly answered only by advanced students may be calibrated as a high skill assessment item. Measurements of how well each assessment item discriminates or determines the user's language skill may also be taken and stored along with the assessment items.

The assessment items may be calibrated using any desired scale. As non-limiting examples, each assessment item in the plurality of assessment items may be assigned a calibrated score between 1 and 100, between −10 and 10 or on a logarithmic scale, and optionally on a logarithmic scale between −6 and 6. The calibration score for each assessment item may be used to match the assessment item to an appropriate user 170 having a language skill level that matches, is close or is within a window or a range to the calibration score of the assessment item.

The test item bank, i.e., the assessment items, may be calibrated using a methodology called Item Response Theory. Item Response Theory tests psychological traits, such as language. The outputs from the statistical analysis computer programs may be in logits which are an open-ended logarithmic scale which may be capped at −6 to +6. There is typically little measurement of language ability outside the −3 to +3 part of the scale. The logarithmic scale is preferably used because the relationship between different levels of language ability are not linear. For example an item on a linear scale which is 40 is not twice as difficult as an item which is 20. For ease of use for the user, the system converts logarithmic scores to linear scaled scores using a transformation function. In the case of this invention, this may be a third order polynomial transformation reflecting the more complex relationship between the scaled item bank and the reported scores.

Each assessment item may also be assigned to a particular language skill. As non-limiting examples, each assessment item may be assigned as a grammar skill, reading comprehension or as a vocabulary skill assessment item. Thus, individual language skills may also be scored, tracked and stored for each user 170 in a database 140 when an assessment item of that particular language skill is asked to the user 170.

Each assessment item may also be assigned a question type. Any question type may be used and any number of different question types may be used with the invention. As non-limiting examples, an assessment item may be in the form of a true or false question type, a multiple choice question type, a reading comprehension question type (have the student read a passage, then answer a question regarding the passage), or a fill in the blank question type.

In some embodiments, the answers/responses to assessment items may be scaled. In other words, the responses are not simply only right or wrong, but may fall along a continuum of right and wrong answers. As an example, a multiple choice question type may include a best answer, a second best answer a third best answer and a fourth best answer, where each answer would give a different scaled score. Scaled answers increases the speed and reduces the number of questions that must be asked of a user to determine the user's language skill.

The invention may also use the fact that some question types, even covering the same material, are harder than other question types. As an example, a fill in the blank question type will generally be more difficult than a multiple choice question type, even for the same material, e.g., responding with the correct definition of a word. This built in random variance helps to improve how quickly the process can reliably determine the user's overall language skill and individual language skills.

The random item pattern may be semi-random as the algorithm tries to reduce the conditional standard error of measurement (CSEM) on all measures. So in line with the design of the invention, the purpose is to get the most accurate measurement as quickly as possible. Another benefit of randomness is security. Test takers will see different items based on their own ability and the random selection. If two students are sat together they will not see the same items. Similarly after the test they cannot compare notes and break the test. This element of randomization is of particular benefit to users or administrators who wish to use it in more proctored environments.

The databases 130 and 140 also preferably record all of the assessment items presented to a particular user 170, so that the same assessment item is not presented to the same user 170 on the same or a later test.

Figure 9:
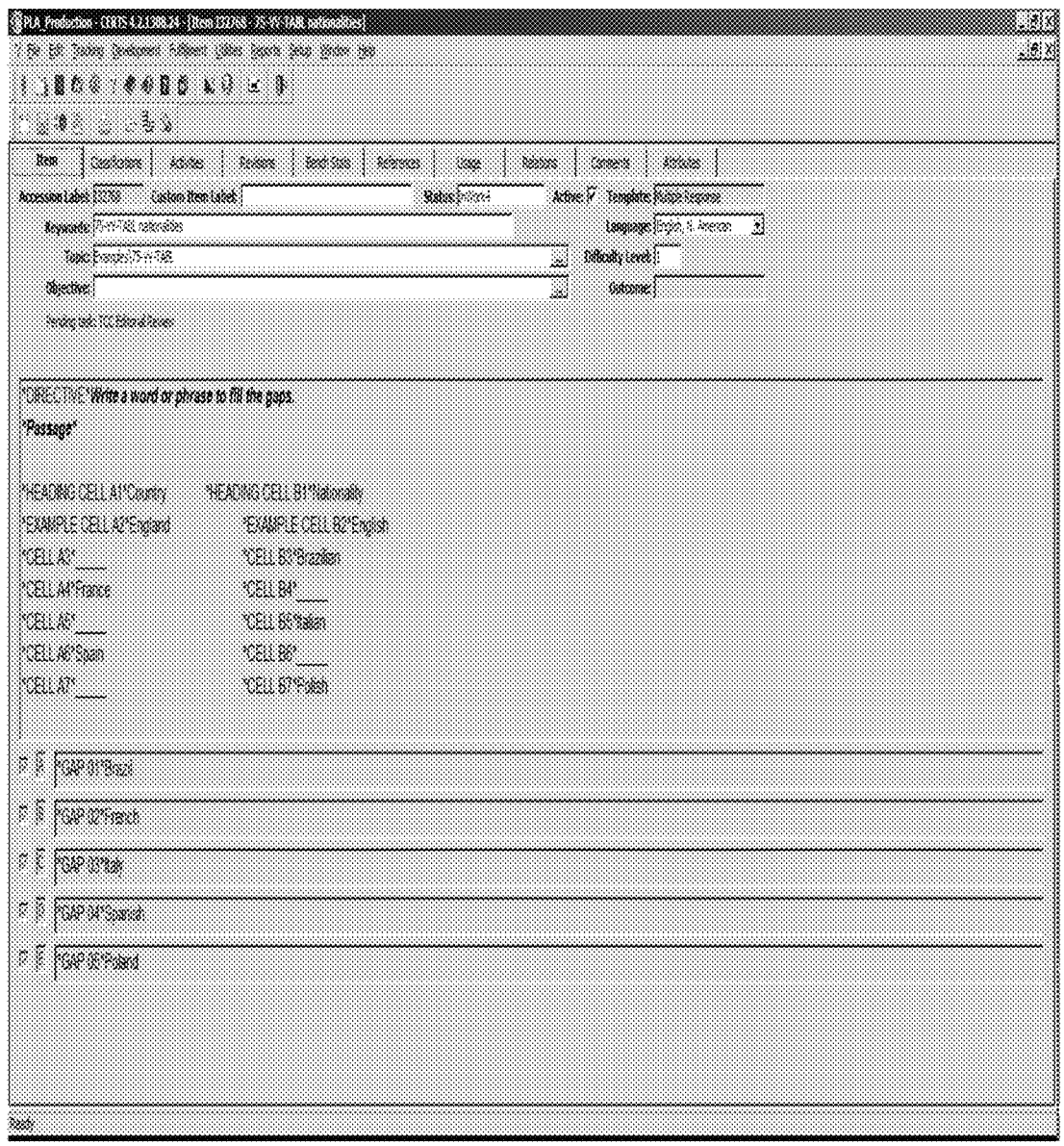
FIG. 9 is an example screenshot illustrating an assessment item stored in a database.

As a non-limiting example, each assessment item may be stored in the database with the assessment item's associated metadata. The metadata may include as non-limiting examples, but is not limited to: any activity on the item, the item content and answer key, classifications stats including length, CEFR level, accent if applicable etc., any revisions of the item, benchmarked statistics, assets and copyright information, where the item has been used, its relation to other items i.e. similar or same items (enemies) and any comments made on the item. FIG. 9 is an example screenshot illustrating an assessment item stored in a database.

Pre-CAT

Figure 2:
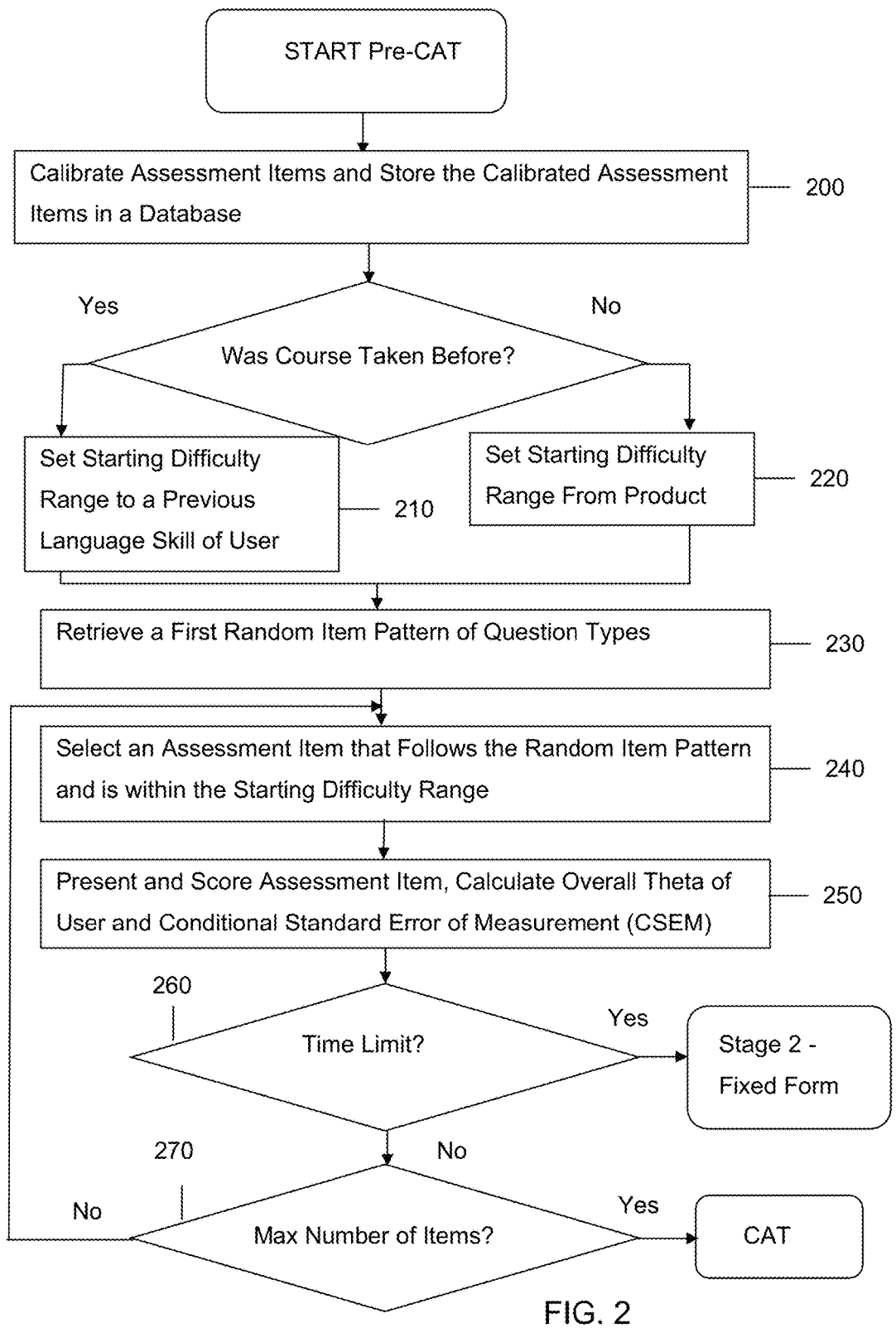
FIG. 2 is a flow chart illustrating an example embodiment of a Pre-CAT portion of a test for adaptively assessing a language learning of a user.

FIG. 2 illustrates an example embodiment of practicing the invention. As previously discussed, a plurality of assessment items may be calibrated and stored in a database. (Step 200) The plurality of assessment items may be used at different times for any number of different users taking any number of different tests. Each assessment item comprises a language skill question and preferably has an associated calibration level, i.e., a difficulty level of the question as determined by asking a large number of students of varying skill levels and a question type, i.e., multiple choice, fill in the blank, true or false, etc.

Figure 6:
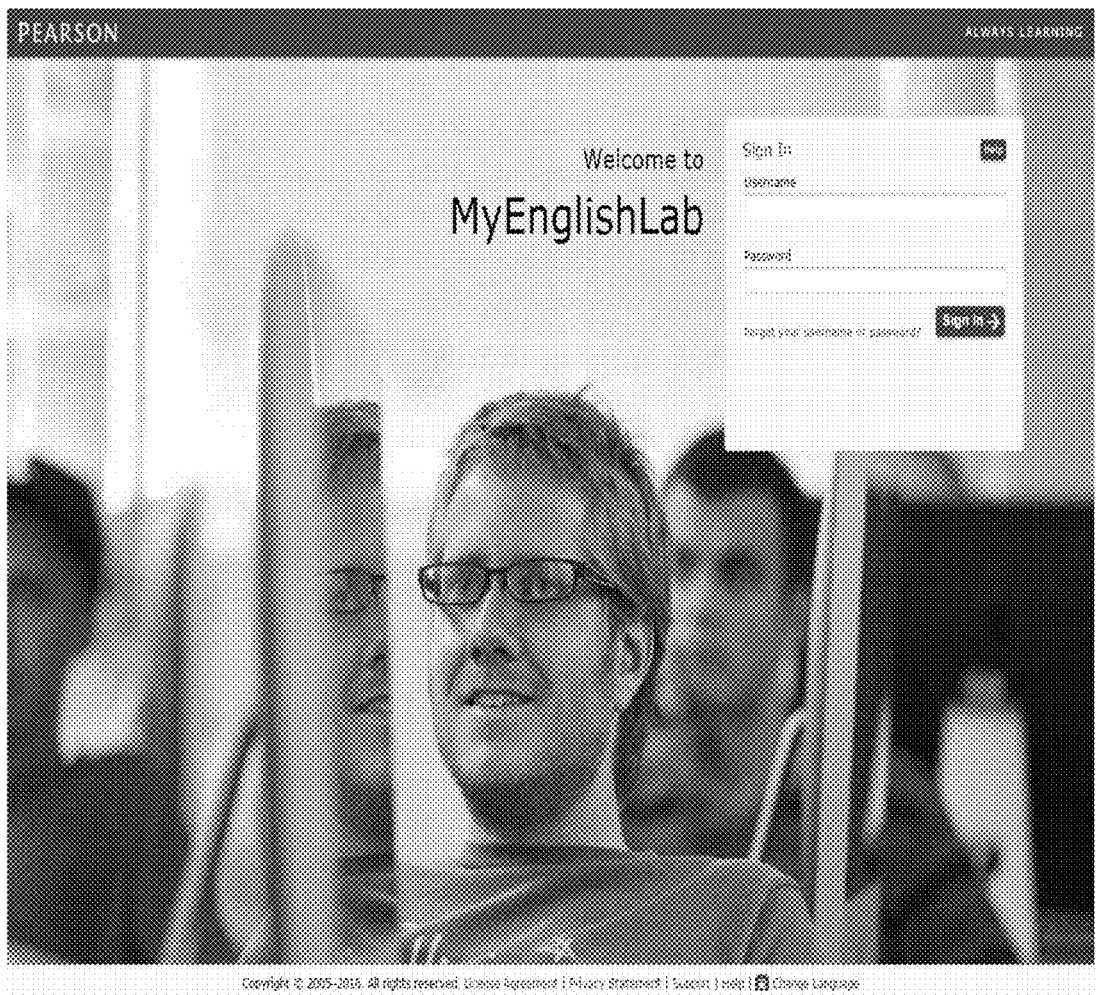
FIG. 6 is an example screenshot where the user may login to the system.

The language learning platform 100 may request and receive a user identification (and possibly a password) from the user 170 using a user interface 160 displayed on a client device 150. FIG. 6 illustrates an example screenshot that may be used by the user 170 to login to the language learning platform 100. The language learning platform 100 may look up the user's identification in a database of users' histories 140 to determine whether or not the system is familiar with the user 170, and if so, what the overall language skill of the user 170 was. The previous overall language skill of the user 170 as read from the database of users' histories 140 may be used as a starting difficulty range for the user 170. (Step 210)

If the user 170 is not in the database of users' histories 140, the language learning platform 100 may retrieve a difficulty level of a learning product currently being used by the user 170. As an example, if the product currently being used by the user 170 is a beginning language course, then the starting difficulty range for the user 170 may be "beginner" or a number on a scale representing "beginner." On the other hand, if the product currently being used by the user 170 is for an advanced language course, then the starting difficulty range for the user 170 may be "advanced" or a number on the scale representing "advance." (Step 220)

The language learning platform 100 may determine or retrieve a desired number of assessment items that the user 170 may respond to as part of the Pre-CAT portion of the test and a time limit to respond or answer the assessment items. The number of assessment items and the time limit to respond to or answer the assessment items may be any desired number of assessment items and any desired time limit. As a non-limiting example, the language learning platform 100 may retrieve from a database for the user 170 to respond or answer four questions within a 10 minute time limit as part of the Pre-CAT portion of the test.

The language learning platform 100 may then retrieve or generate a random item pattern that comprises a sequence of question types that is at least as long as the desired number of assessment items for the Pre-CAT portion of the test. As a non-limiting example, the question types in the random item pattern may be of the pattern 1) fill in the blank, 2) multiple choice, 3) fill in the blank and 4) true or false. (Step 230) This example random item pattern has a sequence length of four, while three different question types are used, i.e., fill in the blank (used twice), multiple choice, and true or false. This example random item pattern may be used to select four assessment items for the user 170, where each assessment item question type follows the sequence in the random item pattern.

The language learning platform may generate CSEM for the overall score and the 6 subscores after every item. The language learning platform selects items which collect scores on a particular skill in order to reduce the CSEM on that skill. It may do this iteratively for all scores while selecting items semi-randomly.

Once the random item pattern has been generated or received, the language learning platform 100 may then select an assessment item from the database of calibrated assessment items 130 that matches the first question type (in the example above the first question type is fill in the blank) and a starting difficulty range for the user 170 (as an example, it may have been determined that the user 170 is a beginner). In preferred embodiments, the language learning platform 100 discards assessment items that have been previously asked to the user 170 and only presents and scores assessment items that have not been previously presented to the user 170. (Step 240) In this example, the first assessment item presented to the user 170 would be a fill in the blank type of question that has been calibrated for a beginner.

Figure 7:
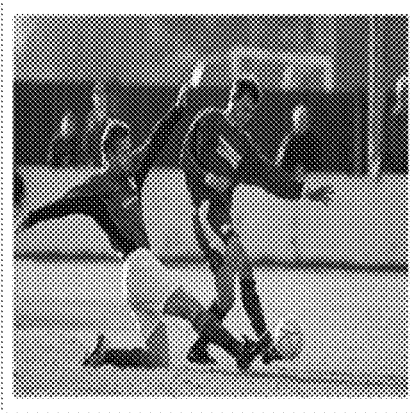
FIG. 7 is an example screenshot of the language learning platform displaying an assessment item to the user.

The language learning platform 100 may present the selected assessment item to the user 170 on the user interface 160 of the client device 150. FIG. 7 illustrates an example screenshot that may be used to present an assessment item to the user 170. The language learning platform 100 may receive and score the response. The language learning platform 100 may update the overall language skill of the user 170 based on the user's response to the selected assessment item. Thus, a correct response may increase the user's overall language skill while an incorrect response may decrease the user's overall language skill. The updated language skill may then be used in selecting the next assessment item for the user 170. (Step 250) It should be noted that the user's overall language skill does not have to match the calibrated difficulty of each assessment item exactly, but selected assessment items are preferably close or within a predefined range, window or bracket of the calculated user's overall language skill.

In an example embodiment, all items may be calibrated on the same scale so the response of the user to the items will be dealt with in the same way for all items. The response to the item may be scored either dichotomously or polytomously depending on the item type. There may be a difficulty value associated with every level of response. For a dichotomous item there are only 2 available scores, 0 and 1. The calibrated score of 0 may be 0, the calibrated score for a 1 may depend on the difficulty of the item. For polytomous items there may be more than one score point. For example, an item may have 4 score points. 0, 1, 2 and 3. Where 3 is the maximum score. The user may be assigned score points based on their performance on the item. The more able students will get a 3 while the less able students will get a 1 or a 0. A 0 will have a calibrated score of 0 but the other scores, i.e., 1, 2 and 3 may have different calibrated scores based on the difficulty of the item. So for example, a 3 on an easy item may be worth less than a 1 on a very difficult item. Polytomous item difficulties may be plotted on a graph and the distribution and peak will show where the item measures best. This is called the Point of Maximum Information (POMI). By optimizing the test using the POMI, an accurate assessment in a short time scale is possible.

This process may be repeated for each question type in the random item pattern. Thus, in the above example, the first assessment item will be a fill in the blank type of question, the second assessment item will be a multiple choice type of question, the third assessment item will be a fill in the blank type of question and the fourth assessment item will be a true or false type of question. The first, second, third and fourth assessment items are preferably selected based on the most recent updated user's overall language skill, which is recalculated after scoring each previous assessment item.

The disclosed process has the advantage of updating the user's overall language skill after each assessment item so that the next selected assessment item is matched to the updated user's overall language skill. This process quickly leads to calibrated assessment items of appropriate difficulty for the user 170 which then further improves the accuracy of the calculation of the user's overall language skill.

The disclosed process may also calculate a skill level for one or more different skills during the testing. As non-limiting examples, a skill level for grammar and a skill level for vocabulary may be individually presented, scored and tracked, with scores saved in the database of users' histories 140.

The disclosed process may also calculate a standard error of measurement (SEM) or a conditional standard error of measurement (CSEM). There are many different ways to calculate the SEM or CSEM and the invention is not limited to any particular formula, equation or method. The error of measurement (EOM) is a difference between the score the user 170 actually obtained on one or more assessment items and a hypothetical score that the user 170 would have obtained if the one or more assessment items had been a perfect measure of the language skill of the user 170. However, while the true score and the EOM cannot be determined for a single user, the mean and standard deviation of the EOM may be estimated for a group of users. The mean of the EOM for a group of users should be zero as the positive and negative values should cancel out. The SEM is an estimate of the standard deviation of the EOM for a group of users. However, the SEM often varies at different score levels. As a common problem, the SEM is typically smaller for scores near the extremes of the scale and larger near the middle of the scale. The SEM at a particular score level or ability level is hereby defined to be the CSEM.

SEM may be calculated using a standard formula as shown below. $s.e.(\hat{\theta})=1/\sqrt{TestInf(\hat{\phi})}$ The measure may be the Conditional SEM as the SEM is preferably conditional on the candidate's theta (ability) score at any point in the test.

The above described pre-CAT may terminate early if a time limit has been reached before the user 170 has responded to all of the assessment items. As a non-limiting example, after 10 minutes the pre-CAT may be terminated if the user 170 has not responded to all of the assessment items within that time. If the time limit has been reached, the pre-CAT portion of the test may be terminated and the user 170 is preferably directed to a fixed form portion of the test more fully described below. (Step 260)

Alternatively, the above process may be terminated after the user 170 has responded to the desired number of assessment items in the pre-CAT section of the test. If the user 170 has responded to the desired number of assessment items, the user 170 may proceed to the CAT portion of the test. (Step 270)

CAT

Figure 3:
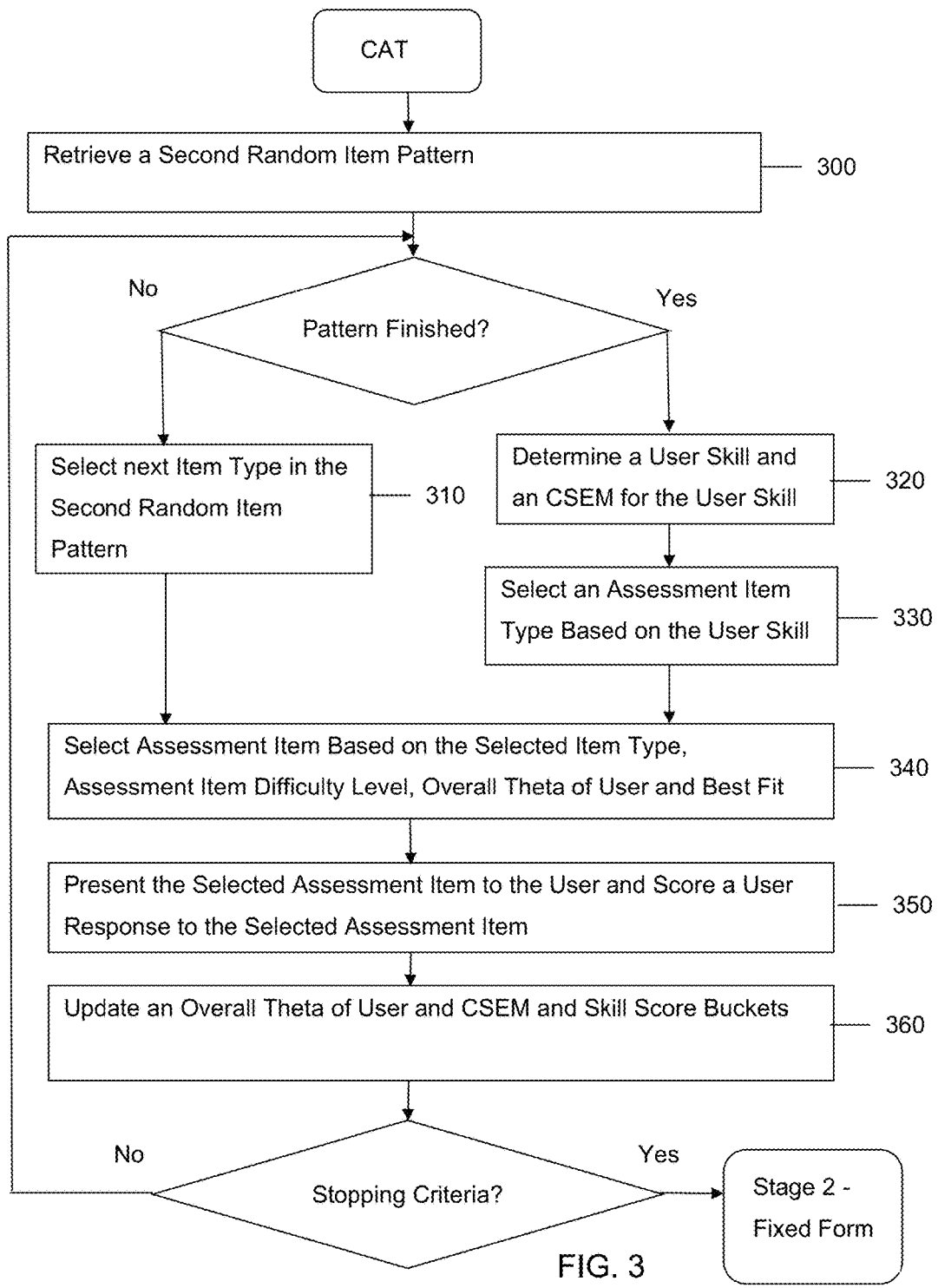
FIG. 3 is a flow chart illustrating an example embodiment of a CAT portion of the test for adaptively assessing the language learning of the user.

FIG. 3 illustrates an example embodiment of the CAT portion of the test, which preferably starts immediately after the Pre-CAT portion of the test (unless the user 170 on the Pre-CAT portion of the test went past the time limit and went to the fixed form portion of the test). At this point in the test, the language learning platform 100 will have the overall language skill and individual skills of the user 170 as calculated by the Pre-CAT portion of the test.

The language learning platform 100 may determine or retrieve a desired number of assessment items that the user 170 may respond to as part of the CAT portion of the test and a time limit to respond or answer the assessment items in the CAT portion of the test. As with the Pre-CAT portion of the test, the number of assessment items and the time limit to respond to or answer the assessment items may be any desired number of assessment items and any desired time limit. As a non-limiting example, the language learning platform 100 may retrieve from a database for the user 170 to respond or answer five questions with a 15 minute time limit as part of the CAT portion of the test.

The language learning platform 100 may then retrieve or generate a random item pattern that comprises a sequence of question types that is at least as long as the desired number of assessment items for the Pre-CAT portion of the test. As a non-limiting example, the question types in the random item pattern may be of the pattern 1) multiple choice, 2) true or false, 3) multiple choice, 4) fill in the blank and 5) true or false. (Step 300) This example random item pattern has a sequence length of five, while three different question types are used, i.e., multiple choice (used twice), true or false (used twice) and fill in the blank. This example random item pattern may be used to select five assessment items for the user 170, where each assessment item follows the random item pattern of question types.

Once the random item pattern has been generated or received, the language learning platform 100 may then select an assessment item from the database of calibrated assessment items 130 that matches the first question type (in the example above the first question type is multiple choice) and an overall language skill for the user 170 (as an example, it may have been determined that the user 170 is at an intermediate language skill level). (Steps 310 and 340)

The language learning platform 100 may also select the assessment item having the point of maximum information. An assessment item too hard or too easy for the user 170 will provide little information, while an assessment item at the point of maximum information will provide the maximum information to be able to focus in on the user's exact language skill. The Point of Maximum Information is also known as the Maximum Likelihood Estimation. The Maximum Likelihood estimation allows the estimation of a value from a population without data on the whole population. The Maximum Likelihood Estimation assumes a normal distribution. The Maximum Likelihood is similar to a mean but for the purposes of this assessment may be more granular. To calculate the Maximum Likelihood Estimation, the Maximum Likelihood Estimation uses the distribution of the logit difficulties of the score points of the polytomous item rather than calculating a mathematical mean.

In preferred embodiments, the language learning platform 100 discards assessment items that have been previously asked to the user 170 and only presents and scores assessment items that have not been previously presented to the user 170.

The language learning platform 100 may present the selected assessment item to the user 170 on the user interface 160 of the client device 150, receive a response to the assessment item from the user 170 and score the response. (Step 350) The language learning platform 100 may update the overall language skill of the user 170 based on the user's response to the selected assessment item. Thus, a correct response may increase the user's overall language skill while an incorrect response may decrease the user's overall language skill. This updated language skill may then be used in selecting the next assessment item for the user 170. It should be noted that the user's overall language skill does not have to match the calibrated difficulty of each selected assessment item exactly or perfectly, but the selected assessment items are preferably close or within a range or a window of the calculated user's overall language skill. In a preferred embodiment, the assessment item that provides the maximum amount of information is selected to be presented to the user 170. The language learning platform 100 may also, after scoring a response to each assessment item, calculate a new CSEM and update the scores for individual language skills in the database for users' histories. (Step 360)

This process may be repeated for each question type in the random item pattern. Thus, in the above example for the CAT portion of the test, the first assessment item will be a multiple choice type of question, the second assessment item will be a true or false type of question, the third assessment item will be a multiple choice type of question, the fourth assessment item will be a fill in the blank type of question and the fifth assessment item will be a true or false type of question. The first, second, third, fourth and fifth assessment items are preferably selected based on the most recent updated user's overall language skill, which may be recalculated after scoring each previous assessment item, the calibrated levels of the assessment items and the best fit.

The disclosed process has the advantage of updating the user's overall language skill after each assessment item so that the next selected assessment item is matched to the updated user's overall language skill. This process quickly leads to calibrated assessment items of appropriate difficulty for the user 170 which then further improves the accuracy of the calculation of the user's overall language skill. Conventional methods may not ask enough questions and thus not have an accurate user's language skill or they may ask too many questions and thus waste time in determining the user's language skill.

The disclosed process may also calculate a skill level for one or more language skills during the testing. Each assessment item may be used to calculate a user's overall language skill and used to calculate one or more language skill levels. As non-limiting examples, a skill level for grammar and a skill level for vocabulary (assuming the assessment item was either a grammar or a vocabulary question) may be determined based on the user's responses to the assessment items with scores saved in the database of users' histories 140.

After the CAT random item pattern is exhausted, the language learning platform 100 may select question types using any desired method. As a non-limiting example, a question type for the next assessment item may be selected based on the highest skill level CSEM of the user 170 or the user's overall language skill CSEM. As another example, the language learning platform 100 may select question types appropriate for the user's overall language skill or a single (optionally the highest) skill level of the user 170. As examples, users having a low overall language skill may be given true or false questions (an easy question type), users having an intermediate overall language skill may be given multiple choice questions (an intermediate question type) and users having an advance overall language skill may be given fill in the blank questions (a hard question type). Thus, after the CAT random item pattern is exhausted, any number of additional assessment items may be present and scored from the user 170 until one or more of the following stopping criteria is met.

One stopping criteria for the CAT process may be when a predetermined maximum number of questions have been presented and scored from the user 170. Once the user 170 has responded to a predetermined maximum number of assessment items, the language learning platform 100 may stop the CAT portion of the test direct the user 170 to the stage 2-fixed form portion of the test.

Another stopping criteria for the CAT process may be when a CAT time limit has been reached. The above described CAT process may terminate if a time limit has been reached. As a non-limiting example, after 15 minutes the CAT portion of the test may be terminated if the user 170 has not responded to all of the assessment items within that time. If the time limit has been reached, the CAT portion of the test may be terminated and the user 170 is preferably directed to the stage 2-fixed form portion of the test.

Another stopping criteria for the CAT process may be when a CSEM for the user's overall language skill is less than a predetermined threshold. The predetermined threshold may be any desired value. As a non-limiting example, the CAT portion of the test may be terminated when the CSEM for the user's overall language skill is less than 65%. Once the currently calculated CSEM is below the predetermined threshold, the CAT portion of the test may be stopped and the user 170 may be directed to the stage 2-fixed form portion of the test.

Stage 2-Fixed Form

Figure 4:
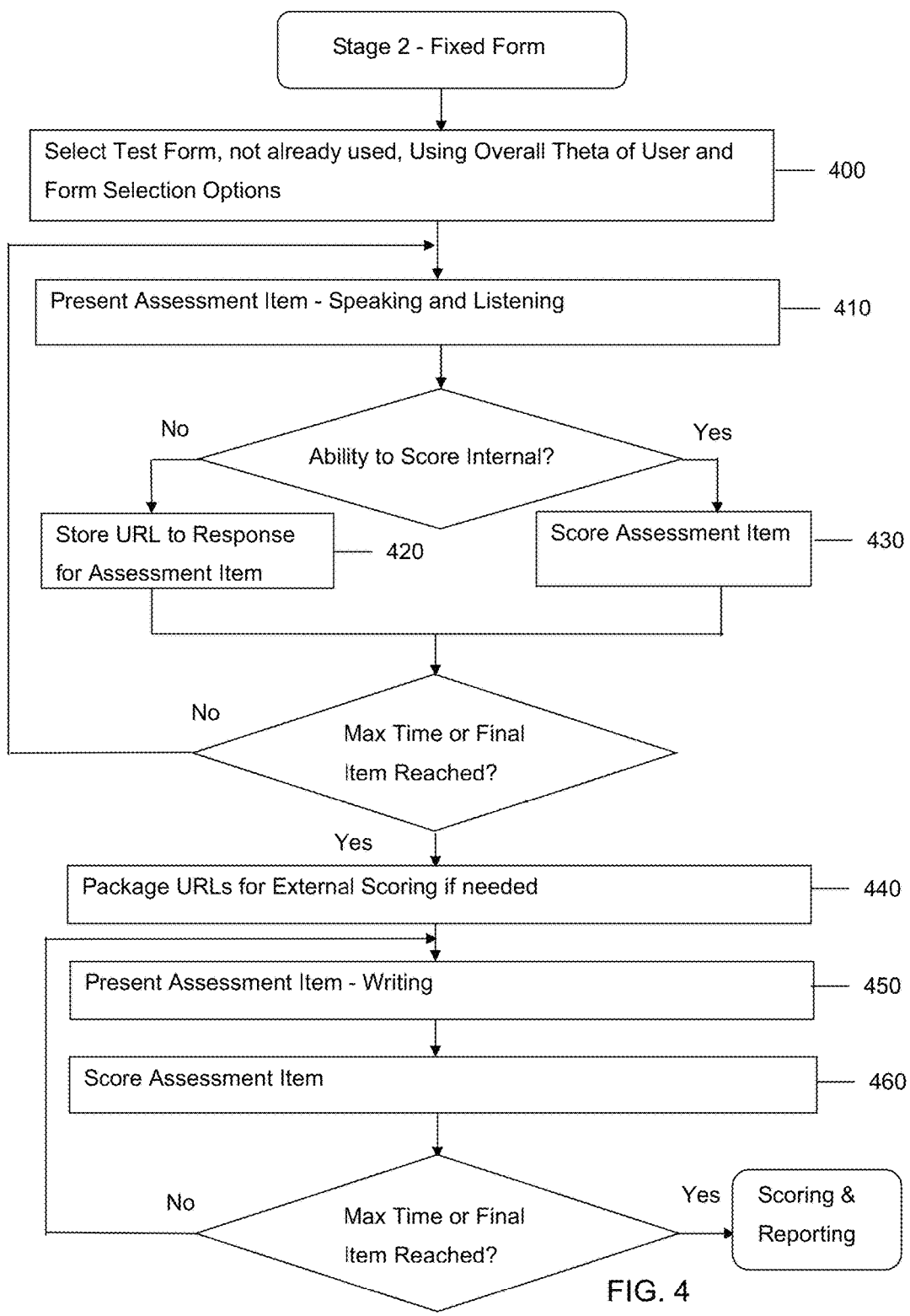
FIG. 4 is a flow chart illustrating an example embodiment of a stage 2-fixed form portion of the test for adaptively assessing the language learning of the user.

FIG. 4 illustrates an example embodiment of the fixed form portion of the test, which preferably starts immediately after the Pre-CAT portion of the test (unless the user 170 on the Pre-CAT portion of the test went past the time limit, skipped the CAT portion of the test and went to the fixed form portion of the test). At this point in the test, the language learning platform 100 will have the overall language skill and individual skills of the user 170 as calculated by the Pre-CAT and CAT portion of the test.

The language learning platform 100 may also use either the user identification or a new user identification for the fixed form portion of the test to exclude any fixed forms already presented to the user 170. A fixed form for listening, speaking and writing may be selected that matches or corresponds in difficulty level with the overall language skill of the user 170. The user's overall language skill may be calculated and updated throughout the Pre-CAT and CAT portions of the test. Preferably, the selected fixed form has not been seen by the user 170. The selected fixed form may be stored in the database of users' histories 140 so that the same fixed form will not be presented to the user 170 in a later test. (Step 400)

The language learning platform 100 may present the fixed form for listening to the user 170 in the user interface 160 on the client device 150. The user 170, after hearing a spoken word, phrase or sentence, may respond by typing into the user interface 160 on the client device 150 what the user 170 heard, using the same language. The response of the user may be recorded, scored and stored in the database of users' histories 140.

The language learning platform 100 may present the fixed form for speaking to the user 170 in the user interface 160 on the client device 150. The user 170, after reading a word, phrase or sentence, may respond by speaking the word, phrase or sentence into a microphone on the client device 150. The response of the user 170 may be recorded, possibly by a microphone on the client device 150, scored and stored in the database of users' histories 140. (Steps 410 and 430)

The language learning platform 100 may present the fixed form for writing to the user 170 in the user interface 160 on the client device 150. (Step 450) The user 170, after hearing a word, phrase or sentence, may respond by writing the word, phrase or sentence into a field or area in the user interface 160 of the client device 150. The response of the user 170 may be recorded, scored and stored in the database of users' histories 140. (Steps 410, 430 and 460)

In some embodiments, the language learning platform 100 may not have the capability to score the spoken and/or written responses from the user 170 and therefore must send the spoken and/or written responses to a third party for scoring. As a non-limiting example, the language learning platform 100 may store the spoken and/or written responses at one or more locations identified by a URL and send the URL(s) to the third party so that the third party may access the spoken and/or written responses. (Steps 420 and 440) As another non-limiting example, the language learning platform 100 may send an audio file for the spoken part of the test and/or a .pdf file for the written portion of the test. After the third party scores the spoken and/or written responses, the language learning platform 100 may then receive the scores from the third party and save the scores in the database of users' histories 140.

The language learning platform 100 may update the overall language skill of the user 170 and the CSEM of the overall language skill of the user 170 based on the scores for the response to the fixed forms for speaking, listening and writing. The language learning platform 100 may modify the user interface 160 to notify the user 170 of the overall language skill of the user 170. The language learning platform 100 may record the overall language skill and CSEM to the database of users' histories 140.

The stage 2-fixed form portion of the test may be terminated at any point in the process after the stage 2-fixed form time limit has been reached. As a non-limiting example, the stage 2-fixed form portion of the test may have a 15 minute time limit and the stage 2-fixed form portion of the test may be stopped after 15 minutes. After the stage 2-fixed form portion of the test is terminated, the testing process may continue with the scoring and reporting portion of the test.

As another embodiment, there may be a stage 2-fixed form time limit for the speaking portion of the test, a stage 2-fixed form time limit for the listening portion of the test and/or a stage 2-fixed form time limit for the writing portion of the test. As a non-limiting example, there may be no time limits for the speaking and listening portions of the test, but a 5 minute time limit for the writing portion of the test. After the stage 2-fixed form portion of the test is terminated, the testing process may continue with the scoring and reporting portion of the test.

The stage 2-fixed form portion of the test may also be terminated after the user 170 has been presented and responded to a maximum number of assessment items. As a non-limiting example, the stage 2-fixed form portion of the test may be terminated after the user 170 has been presented and responded to 10 speaking, listening and writing assessment items. After the stage 2-fixed form portion of the test is terminated, the testing process may continue with the scoring and reporting portion of the test.

As described in the Pre-CAT and CAT portions of the test, the user's overall language skill may be a running number that is updated after each assessment item (in this case, a speaking, listening and writing question) and used to select the next speaking, listening and/or writing question. In another embodiment, the speaking, listening and writing questions are selected based on the user's overall language skill coming into the stage 2-fixed form portion of the test. In other words, how the user 170 does on earlier speaking, listening and/or writing assessment items/questions is not used in selecting later speaking, listening and/or writing questions in the rest of the stage 2-fixed form portion of the test.

Scoring and Reporting

Figure 5:
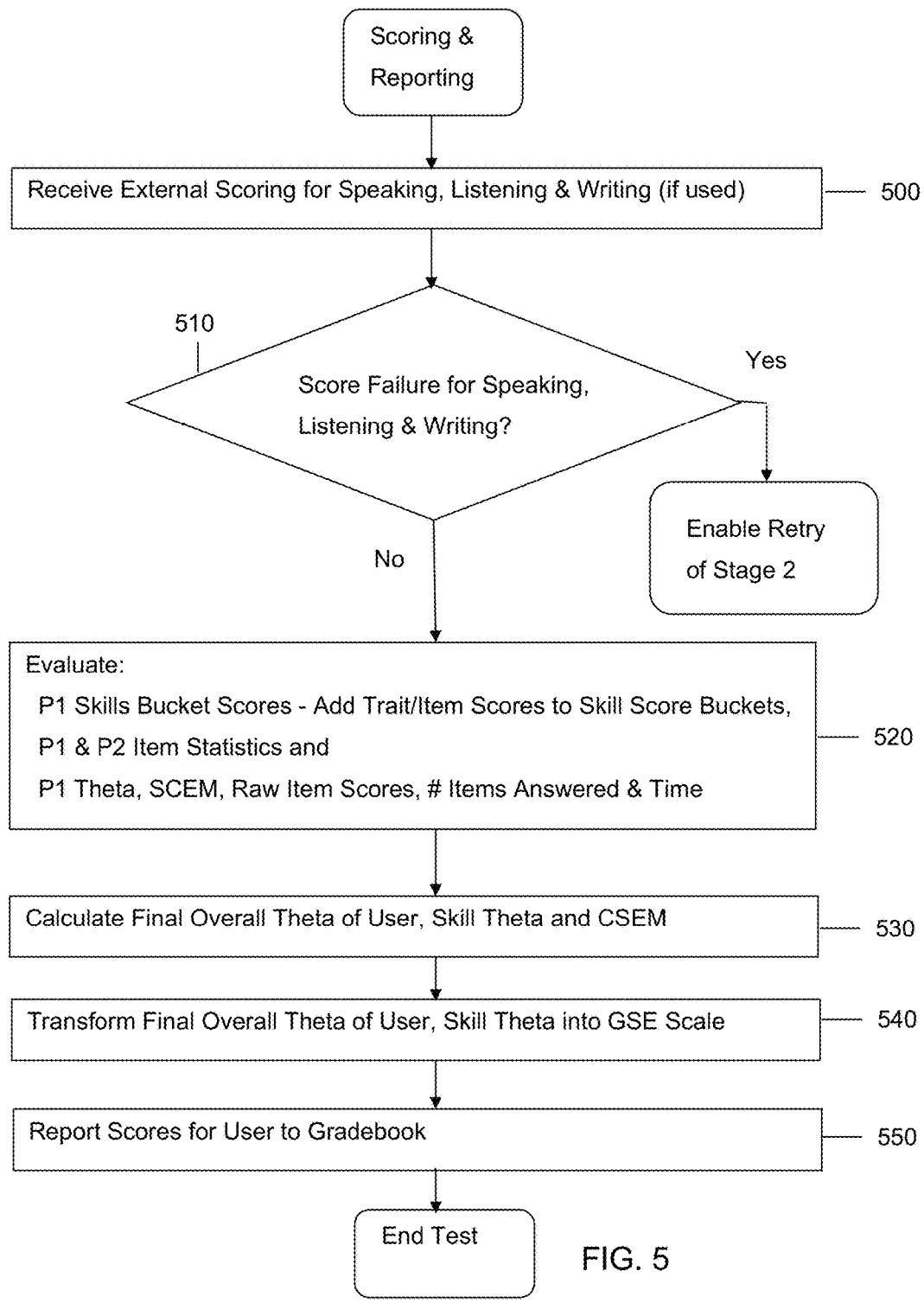
FIG. 5 is a flow chart illustrating an example embodiment of a scoring and responding portion of the test for adaptively assessing the language learning of the user.

FIG. 5 illustrates an example embodiment of the scoring and reporting portion of the test, which preferably starts right after the stage 2-fixed form portion of the test. The language learning platform 100 may receive external scoring for the speaking, listening and/or writing portions from one or more third parties if the one or more third parties were requested to score those portions of the stage 2-fixed form portion of the test. (Step 500) Whether the language learning platform 100 scored the speaking, listening and/or writing questions itself or received the scores from one or more third parties, the language learning platform 100 determines if the user 170 passed or failed the speaking, listening and/or writing portion of the test, i.e., the stage 2-fixed form portion of the test.

If the user 170 did not pass the speaking, listening and/or writing portions of the test, the user 170 may be presented with a message on the user interface 160 of the client device 150 notifying the user 170 that the user 170 did not pass the speaking, listening and/or writing portions of the test. The user 170 may be given an option to retake the stage 2-fixed form portion of the test covering speaking, listening and writing. (Step 510)

The language learning platform 100 may update one or more language skills, the user's overall language skill and the CSEM for the language skills and the user's overall language skill based on the scores from the stage 2-fixed form test (speaking, listening and/or writing portion of the test). (Steps 520 and 530) In some embodiments, the language learning platform 100 may also transform the final user's overall language skill and/or the final language skills into another scale that reflects the user's proficiency in the language being tested. (Step 540)

The language learning platform 100 may report and record one or more scores into a database, such as a gradebook database, that reflect how the user 170 performed on the Pre-CAT, CAT and stage 2-fixed form portions of the test.

Figure 8:
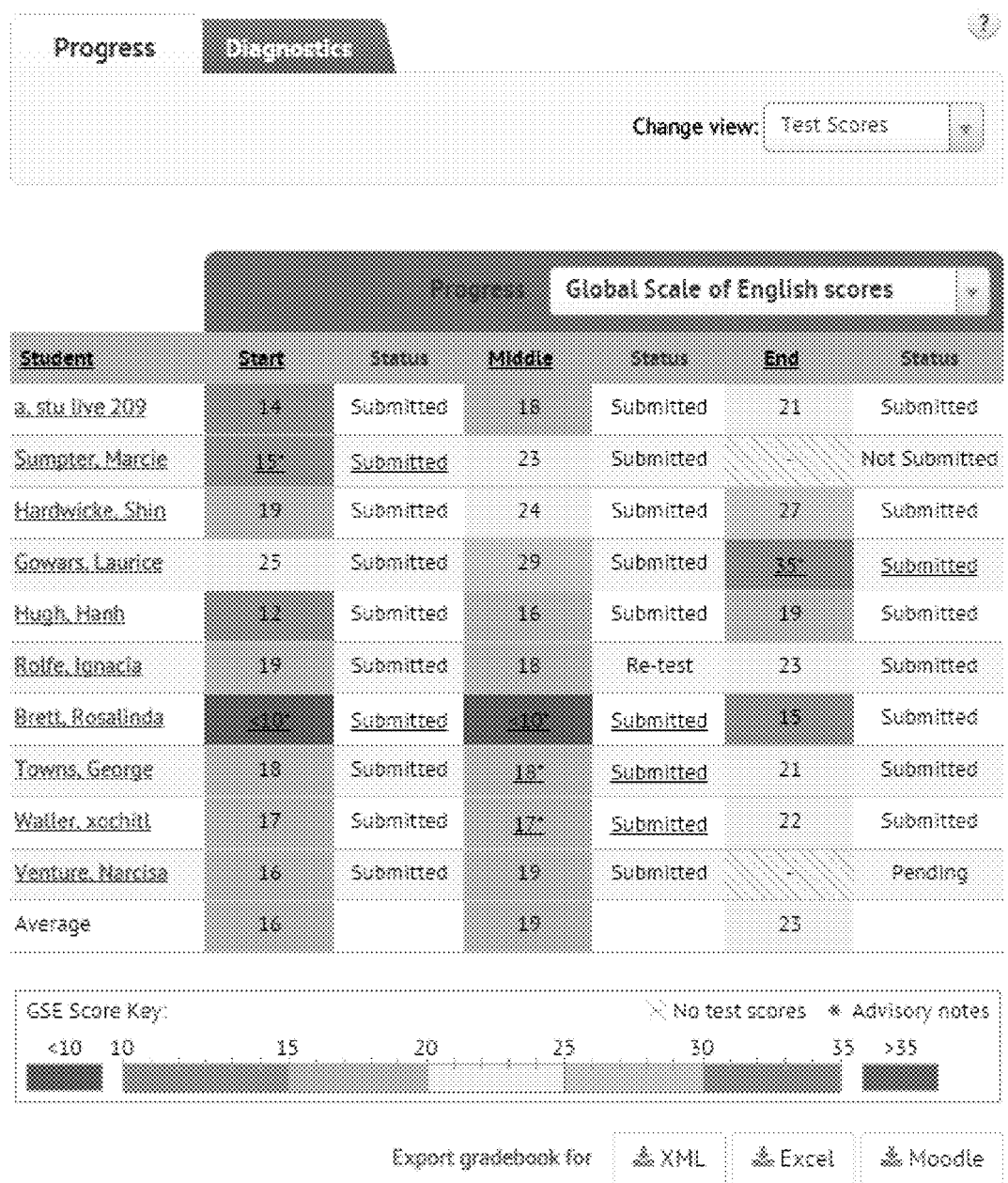
FIG. 8 is an example screenshot of the language learning platform displaying a result of the testing to the user.

The language learning platform 100 may also send and display a notification of the scores to the user interface 160 on the client device 150 so that the user 170 knows the score the user 170 achieved on the test. FIG. 8 illustrates an example screenshot that may be used to display to the user 170 the user's score on the test.

The above described process may be used as a standalone test for determining a user's language proficiency. In other embodiments, the above described process may be used before, during and/or after a language lesson to determine the effectiveness of the language lesson and the improvements, or lack thereof, to the user's language skill as the user performs the language lesson.

In another embodiment, the Pre-Cat, CAT and stage 2-fixed form portions of the test are given before a language lesson has started to determine a baseline for the user 170. The CAT and stage 2-fixed form portions of the test may be given at an intermediate point during the language lesson to check the progress of the user 170 and to make sure the language lesson is improving the language skills of the user 170. The CAT and stage 2-fixed form portions of the test may also be given after the language lesson has ended to determine a final user's overall language skill. The final user's overall language skill may be compared to the initial user's overall language skill to determine how much progress the user 170 made during the language lesson and to assist in determining future language lessons of appropriate difficulty for the user 170.

While the user's overall language skill was recited as being used in many of the disclosed embodiments of the invention, other embodiments may use a different language skill of the user 170. As non-limiting examples, other embodiments may use the highest language skill of the user 170, the vocabulary language skill of the user 170 or the grammar language skill of the user 170. It should be noted that as the process is customized to a particular user 170 at a particular time and includes a random item pattern of question types, each test will be unique.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A system for adaptively assessing a language learning of a user configured to:
   receive a user identification from the user using a user interface displayed on a client device;
   search in a first database for a history of the user associated with the user identification;
   estimate an overall language skill of the user based on the history in the first database of the user, a difficulty level of a product being used by the user and/or responses to an initial plurality of assessment items displayed on the user interface to the user;

retrieve a random item pattern comprising a sequence of question types, wherein at least one question type is a multiple choice type of question and at least one question type is a fill in the blank type of question;

sequentially for each item in the random item pattern:
select a first next question type in the random item pattern,
select a first assessment item from a second database of a plurality of calibrated assessment items, wherein the first assessment item matches the first next question type in the random item pattern and matches the overall language skill of the user,
modify the user interface to present the first assessment item to the user,
generate a first score for a first response from the user to the first assessment item, and
update the overall language skill of the user and a conditional standard error of measurement for the overall language skill of the user based on the first score;

select one or more fixed forms for speaking, listening and writing based on the overall language skill of the user;
modify the user interface to present the one or more fixed forms for speaking, listening and writing to the user;
generate a third score for a third response to the one or more fixed forms for speaking, listening and writing;
update the overall language skill of the user and the conditional standard error of measurement of the overall language skill of the user based on the third score for the third response to the one or more fixed forms for speaking, listening and writing;
modify the user interface to notify the user of the overall language skill of the user;
record the overall language skill of the user to the first database; and
determine a future language lesson of appropriate difficulty for the user based on the recorded overall language skill of the user.

2. The system of claim 1, further configured to:
before the estimate the overall language skill of the user, retrieve a difficulty level of the product being used by the user.

3. The system of claim 1, wherein the overall language skill is expressed on a logarithmic scale.

4. The system of claim 1, wherein the second database comprises the plurality of calibrated assessment items, wherein each assessment item in the plurality of calibrated assessment items is associated with a known difficulty level of the assessment item and a question type of the assessment item.

5. The system of claim 1, wherein the first database comprises a record of every assessment item presented to the user.

6. The system of claim 5, wherein the system does not present an assessment item in the plurality of calibrated assessment items to the user that was previously presented to the user.

7. The system of claim 1, further configured to:
before the selection of one or more fixed forms for speaking, listening and writing, repeat the steps, at least once, of:
select a second next question type corresponding to a second language skill of the user,
select a second assessment item from the second database of calibrated assessment items, wherein the second assessment item matches the selected second next question type and matches the second language skill of the user,
modify the user interface to present the second assessment item to the user,
generate a second score for a second response from the user to the second assessment item,
update the overall language skill of the user and the conditional standard error of measurement for the overall language skill of the user based on the second score, and
compare the conditional standard error of measurement for the overall language skill of the user to a predetermined threshold,
until the conditional standard error of measurement for the overall language skill of the user is less than the predetermined threshold.

8. A system for adaptively assessing a language learning of a user configured to:
retrieve a random item pattern comprising a sequence of question types, wherein at least one question type is a multiple choice type of question and at least one question type is a fill in the blank type of question;
repeat the steps, at least once, of:
sequentially select a first next question type in the random item pattern,
select a first assessment item from a database of a plurality of calibrated assessment items, wherein the first assessment item matches the first next question type in the random item pattern and matches the overall language skill of the user,
modify the user interface to present the first assessment item to the user,
generate a first score for a response from the user to the first assessment item, and
update an overall language skill of the user and a conditional standard error of measurement for the overall language skill of the user based on the first score,
until the conditional standard error of measurement for the overall language skill of the user is less than a predetermined threshold; and
determine a future language lesson of appropriate difficulty for the user based on the recorded overall language skill of the user.

9. The system of claim 8, wherein the overall language skill is expressed on a logarithmic scale.

10. The system of claim 8, wherein the comprises the plurality of calibrated assessment items, wherein each assessment item in the plurality of calibrated assessment items is associated with a known difficulty level of the assessment item and a question type of the assessment item.

11. The system of claim 8, wherein the database comprises a record of every assessment item presented to the user.

12. The system of claim 11, wherein the system does not present an assessment item in the plurality of calibrated assessment items to the user that was previously presented to the user.

13. The system of claim 8, further configured to:
before the selection of one or more fixed forms for speaking, listening and writing, repeat the steps, at least once, of:
select a second next question type corresponding to a second language skill of the user, select a second assessment item from the second database of calibrated assessment items, wherein the second assessment item matches the selected second next question type and matches the second language skill of the user, modify the user interface to present the second assessment item to the user, generate a second score for a second response from the user to the second assessment item, update the overall language skill of the user and the conditional standard error of measurement for the overall language skill of the user based on the second score, and compare the conditional standard error of measurement for the overall language skill of the user to a predetermined threshold, until the conditional standard error of measurement for the overall language skill of the user is less than the predetermined threshold.

14. The system of claim 8, further configured to cause the processor of the hardware server to:

repeat the steps, at least once, of:

select a second next question type corresponding to a second language skill of the user, select a second assessment item from the database of calibrated assessment items, wherein the second assessment item matches the selected second next question type and matches the second language skill of the user, modify the user interface to present the second assessment item to the user, generate a second score for a second response from the user to the second assessment item, and update the overall language skill of the user and the conditional standard error of measurement for the overall language skill of the user based on the second score, until the conditional standard error of measurement for the overall language skill of the user is less than a predetermined threshold.

15. A method, comprising the steps of:

displaying by a hardware server a user interface on a client device to a user;

searching by the hardware server in a first database for a history of the user;

estimating by the hardware server an overall language skill of the user based on the history of the user in the first database, a difficulty level of a product being used by the user and/or an initial response to an initial assessment item displayed on the user interface to the user;

generating by the hardware server a random item pattern comprising a sequence of question types, wherein at least one question type is a multiple choice type of question and at least one question type is a fill in the blank type of question;

sequentially for each item in the random item pattern:

selecting by the hardware server a first next question type in the random item pattern, selecting by the hardware server a first assessment item from a second database of a plurality of calibrated assessment items, wherein the first assessment item matches the first next question type in the random item pattern and matches the overall language skill of the user, modifying the user interface to present by the hardware server the first assessment item on the client device to the user, generating by the hardware server a first score for a first response from the user to the first assessment item, and updating by the hardware server an overall language skill of the user and a conditional standard error of measurement for the overall language skill of the user based on the first score; and determining a future language lesson of appropriate difficulty for the user based on the recorded overall language skill of the user.

16. The method of claim 15, wherein the overall language skill is expressed on a logarithmic scale.

17. The method of claim 15, wherein the second database comprises the plurality of calibrated assessment items, wherein each assessment item in the plurality of calibrated assessment items is associated with a known difficulty level of the assessment item and a question type of the assessment item.

18. The system of claim 15, wherein the first database comprises a record of every assessment item presented to the user.

19. The system of claim 18, wherein the system does not present an assessment item in the plurality of calibrated assessment items that was previously presented to the user.

20. The method of claim 15, further comprising the steps of:

repeating the steps, at least once, of:

selecting by the hardware server a second next question type corresponding to a second language skill of the user, selecting by the hardware server a second assessment item from the second database of calibrated assessment items, wherein the second assessment item matches the selected second next question type and matches the second language skill of the user, modifying by the hardware server the user interface to present the second assessment item to the user, generating by the hardware server a second score for a second response from the user to the second assessment item, updating by the hardware server the overall language skill of the user and the conditional standard error of measurement for the overall language skill of the user based on the second score, and comparing by the hardware server the conditional standard error of measurement for the overall language skill of the user to a predetermined threshold, until the conditional standard error of measurement for the overall language skill of the user is less than the predetermined threshold.

* * * * *